United States Patent
Pujari et al.

(10) Patent No.: US 9,730,162 B2
(45) Date of Patent: Aug. 8, 2017

(54) POWER MANAGEMENT FOR WLAN CLIENT DEVICES USING LOW ENERGY SIGNALING

(71) Applicant: QUALCOMM Incorporated, San Diego, CA (US)

(72) Inventors: Sunit Pujari, Hyderabad (IN); Hemant Kumar Sahoo, Hyderabad (IN); Imran Ansari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 14/476,478

(22) Filed: Sep. 3, 2014

(65) Prior Publication Data

US 2016/0066274 A1    Mar. 3, 2016

(51) Int. Cl.
*H04W 52/02* (2009.01)
*H04W 84/12* (2009.01)

(52) U.S. Cl.
CPC ... *H04W 52/0235* (2013.01); *H04W 52/0216* (2013.01); *H04W 84/12* (2013.01); *Y02B 60/50* (2013.01)

(58) Field of Classification Search
CPC . H04W 88/06; H04W 84/12; H04W 52/0216; H04L 1/0053
See application file for complete search history.

(56) References Cited

U.S. PATENT DOCUMENTS

| 7,299,009 | B2 | 11/2007 | Hussmann |
| 8,111,677 | B2 | 2/2012 | Wentink |
| 8,712,483 | B2 | 4/2014 | Haartsen et al. |
| 2008/0181155 | A1 | 7/2008 | Sherman et al. |
| 2008/0220770 | A1* | 9/2008 | Qi .......... H04W 68/00 455/426.1 |
| 2010/0141400 | A1 | 6/2010 | Radulescu et al. |
| 2011/0274021 | A1* | 11/2011 | He .......... H04W 52/0238 370/311 |

(Continued)

FOREIGN PATENT DOCUMENTS

EP    2757837 A1    7/2014

OTHER PUBLICATIONS

Agarwal, Yuvraj, et al., "On Demand Paging Using Bluetooth Radios on 802.11 Based Networks", CECS Technical Report #03-22, Jul. 2003, 19 pgs.

(Continued)

*Primary Examiner* — Awet Haile
(74) *Attorney, Agent, or Firm* — Holland & Hart LLP

(57) ABSTRACT

Methods, systems, and devices are described for using low energy (LE) signaling to indicate to a wireless station (STA), prior to transmission of a beacon, whether the beacon will further indicate that an access point (AP) has data to transmit to the STA. In one aspect, a method may include receiving, using a first radio of a wireless STA using a LE communication protocol, a first signal comprising an indication of a traffic indication map (TIM) of a wireless local area network (WLAN) beacon, and selectively powering up a second radio of the wireless STA to receive the WLAN beacon in response to the indication. In one aspect, the wireless STA may power up the first radio at a predetermined interval prior to a target beacon transmission time (TBTT) of the WLAN beacon.

26 Claims, 12 Drawing Sheets

(56) References Cited

U.S. PATENT DOCUMENTS

2015/0208349 A1* 7/2015 Ramamurthy .... H04W 52/0212
370/311

OTHER PUBLICATIONS

ISA/EPO, International Search Report and Written Opinion of the International Searching Authority, Int'l Appl. No. PCT/US2015/043717, Oct. 8, 2015, European Patent Office, Rijswijk, NL, 12 pgs.
IPEA/EP, Second Written Opinion of the International Preliminary Examining Authority, Int'l Application No. PCT/US2015/043717, Sep. 22, 2016, European Patent Office, Rijswijk, NL, 9 pgs.

* cited by examiner

POWER MANAGEMENT FOR WLAN CLIENT DEVICES USING LOW ENERGY SIGNALING

FIELD OF THE DISCLOSURE

The present disclosure, for example, relates to wireless communication systems, and more particularly to techniques for reducing power consumption of a mobile device or wireless station (STA) by selectively powering up a receiver of the STA to receive a beacon from a base station or access point (AP).

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an AP that may communicate with one or more STAs (e.g., mobile devices or client devices). The AP may be coupled to a network, such as the Internet, and enable a mobile device to communicate via the network (and/or communicate with other devices coupled to the AP).

As wireless technologies improve and become more wide spread, the demand for continuous connectivity for STAs is increasing. Technologies, for example implementing IEEE 802.11 standards (e.g., WLANs such as Wi-Fi and Wi-Fi Direct or Peer to Peer (P2P) networks) have been used to address this demand. However, with higher connectivity rates, power or battery consumption of WLAN configured STAs greatly increases. To mitigate this problem, a WLAN STA may sleep or go idle for a time, then wake up at regular intervals to receive a beacon from an AP, which may further indicate to the STA whether to stay awake for pending data transmission from the AP. For example, the beacon may include an indication of whether the AP has one or more packets to transmit to the STA, such as in a traffic indication map (TIM) information element (IE). As beacon size increases, so does the amount of time during which the STA remains awake to receive the beacon. The increase in wakeup time may equate to increased power consumption by the STA, resulting in decreased battery life and user experience.

Additionally, the time during which the STA remains awake to receive a beacon may be affected by congested wireless environments. Congested environments may cause beacon drift, meaning that the AP's target beacon transmission time (TBTT) may not be constant (e.g., due to carrier sense multiple access with collision avoidance (CSMA/CA) techniques implemented in WLANs). Beacon drift may further cause the STA to wake up either early or late to receive the beacon, resulting in a longer wakeup time to receive the beacon and increased power consumption by the STA or a failure to receive the beacon.

SUMMARY

The described features generally relate to one or more improved systems, methods, and/or apparatuses for using low energy (LE) signaling to indicate to a wireless station (STA), prior to transmission of a beacon, whether the beacon will further indicate that an access point (AP) or peer-to-peer group owner (P2P GO) has data to transmit to the STA. In some aspects, the STA may first establish a wireless local area network (WLAN) connection, which may include a set or preconfigured beacon interval time (e.g., 100 ms), with an AP. If both the STA and the AP are capable of supporting LE communications (e.g., Bluetooth LE (BLE) or other LE/unlicensed spectrum communication technology), the STA and the AP may establish a LE connection. Prior to transmitting each beacon, the AP may transmit an LE indication to the STA of whether the AP has pending data for the STA. If the LE signaling indicates that the AP has data to send to the STA, then the STA may wake up for the subsequent beacon interval to receive the beacon. If, however, the LE indication indicates that the AP does not have data to send to the STA, then the STA may remain in idle or sleep mode for the subsequent beacon. In this way, the STA may conserve power by only powering up for a beacon wakeup time period when the corresponding beacon indicates that the AP has data to send to the STA.

In one aspect, a method of wireless communication may include receiving, by a first radio of a STA implementing a LE communication protocol, a first signal including an indication of a traffic indication map (TIM) of a WLAN beacon. The method may also include selectively powering up a second radio of the wireless STA to receive the WLAN beacon in response to the indication. In some cases, the LE communication protocol may include a BLE protocol.

In one aspect, the first signal may be received from an access point or a P2P GO. In some cases, receiving the first signal may include powering up the first radio at a predetermined interval prior to a target beacon transmission time (TBTT) of the WLAN beacon. The first signal may be received periodically at a same periodicity as the WLAN beacon.

In some examples, selectively powering up the second radio may include powering up the second radio to receive the WLAN beacon in response to the first signal indicating that a bit associated with the wireless STA in the TIM of the WLAN beacon is set. In some cases, selectively powering up the second radio may include refraining from powering up the second radio in response to the first signal indicating that a bit associated with the wireless STA in the TIM of the WLAN beacon is not set. In one aspect, the method may additionally include powering up the second radio of the wireless station to receive a second WLAN beacon in response to determining that a second signal including a second indication of a second TIM of the second WLAN beacon has not been received via the LE communication protocol.

In some implementations, the method may further include periodically synchronizing the first radio with the AP or the P2P GO. In some cases, the second radio may be in a sleep state when the first signal is received.

In one aspect, an apparatus for wireless communication may include means for receiving, using a first radio of the apparatus implementing an LE communication protocol, a first signal including an indication of a TIM of a WLAN beacon, and means for selectively powering up a second radio of the apparatus to receive the WLAN beacon in response to the indication. In some cases, the first signal may be received from an access point or a P2P GO. Receiving the first signal may include powering up the first radio at a predetermined interval prior to a TBTT of the WLAN beacon. The first signal may be received periodically at a same periodicity as the WLAN beacon.

In some examples, the means for selectively powering up the second radio may include means for powering up the second radio to receive the WLAN beacon in response to the first signal indicating that a bit associated with the wireless STA in the TIM of the WLAN beacon is set. In some cases, the means for selectively powering up the second radio may include means for refraining from powering up the second radio in response to the first signal indicating that a bit associated with the wireless STA in the TIM of the WLAN beacon is not set. In one aspect, the apparatus may additionally include means for powering up the second radio of the wireless station to receive a second WLAN beacon in response to determining that a second signal including a second indication of a second TIM of the second WLAN beacon has not been received via the LE communication protocol.

In some implementations, the apparatus may further include means for periodically synchronizing the first radio with the AP or the P2P GO. In some cases, the second radio may be in a sleep state when the first signal is received.

In one aspect, an apparatus for wireless communication may include a LE transceiver to receive a first signal using a LE communication protocol, the first signal including an indication of a TIM of a WLAN beacon. The apparatus may further include a WLAN transceiver activator to selectively power up a WLAN transceiver to receive the WLAN beacon in response to the indication. In some cases, the first signal may be received from an access point or a P2P GO. In some examples, the LE transceiver may receive the first signal periodically at a same periodicity as the WLAN beacon.

In some cases, the WLAN transceiver may include a LE transceiver coordinator to power up the LE transceiver at a predetermined interval prior to a TBTT of the WLAN beacon.

In some examples, the WLAN transceiver activator may power up the WLAN transceiver to receive the WLAN beacon in response to the first signal indicating that a bit associated with the apparatus in the TIM of the WLAN beacon is set. In some cases, the WLAN transceiver activator may refrain from powering up the WLAN transceiver in response to the first signal indicating that a bit associated with the apparatus in the TIM of the WLAN beacon is not set. In one aspect, the WLAN transceiver activator may power up the WLAN transceiver to receive a second WLAN beacon in response to determining that a second signal comprising a second indication of a second TIM of the second WLAN beacon has not been received by the LE transceiver using the LE communication protocol.

In some implementations, the apparatus may further include a LE transceiver synchronization controller to periodically synchronize the LE transceiver with the AP or the P2P GO. In some cases, the WLAN transceiver may be in a sleep state when the first signal is received.

In one aspect, a non-transitory computer-readable medium may store computer-executable code for wireless communication, with the code executable by a processor to receive, using a first radio of a wireless STA via a LE communication protocol, a first signal including an indication of a TIM of a WLAN beacon, and selectively power up a second radio of the wireless STA to receive the WLAN beacon in response to the indication. In some cases, the first signal may be received from an access point or a P2P GO. The first signal may be received periodically at a same periodicity as the WLAN beacon. In some examples, the code may be further executable by the processor to power up the first radio at a predetermined interval prior to a TBTT of the WLAN beacon.

In some examples, the code may be further executable by the processor to power up the second radio to receive the WLAN beacon in response to the first signal indicating that a bit associated with the wireless STA in the TIM of the WLAN beacon is set. In some cases, the code may be further executable by the processor to refrain from powering up the second radio in response to the first signal indicating that a bit associated with the wireless STA in the TIM of the WLAN beacon is not set. In one aspect, the code may be further executable by the processor to power up the second radio of the wireless station to receive a second WLAN beacon in response to determining that a second signal including a second indication of a second TIM of the second WLAN beacon has not been received via the LE communication protocol.

In some implementations, the code may be further executable by the processor to periodically synchronize the first radio with the AP or the P2P GO. In some cases, the second radio may be in a sleep state when the first signal is received.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to one or more improved systems, methods, and/or apparatuses for using low energy (LE) signaling to indicate to a STA, prior to transmission of a beacon, whether the beacon will further indicate that an AP or peer-to-peer group owner (P2P GO) has one or more packets to transmit to the STA. In one aspect the LE signaling may include sending, by an AP, the indication via Bluetooth Low Energy (BLE), or other similar LE/unlicensed spectrum communication technology. In some aspects, the STA may first establish a WLAN connection with an AP. The WLAN connection may include a set or preconfigured beacon interval time (e.g., 100 ms). If both the STA and the AP are capable of supporting LE communications, the STA and the AP may then establish a BLE or other LE connection. Prior to transmitting each beacon, the AP may transmit an LE indication to the STA of whether the AP has pending data for the STA.

Accordingly, the STA may power-up to receive the LE indication during an LE wakeup time. The LE wakeup time may be a significantly shorter time period than the beacon wakeup time period, and the power expended by the STA to receive the LE indication may, as a result, be substantially lower than the power required to receive the full beacon. If the LE signaling or indication indicates that the AP has data to send to the STA (e.g., a traffic indication map (TIM) information element (IE) of the beacon corresponding to the STA is set to 1), then the STA may wake up for the subsequent beacon interval to receive the beacon. If, however, the LE indication indicates that the AP does not have data to send to the STA (e.g., the TIM IE of the beacon set to 0), then the STA may remain in idle or sleep mode for the subsequent beacon.

The STA may stay in WLAN idle mode while receiving the LE indications. In the event the STA does not receive any LE indication (e.g., a failed reception of an LE indication) for a beacon interval, the STA may wake up for that beacon interval and receive the associated beacon to ensure no delay in receiving a pending transmission from the AP.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
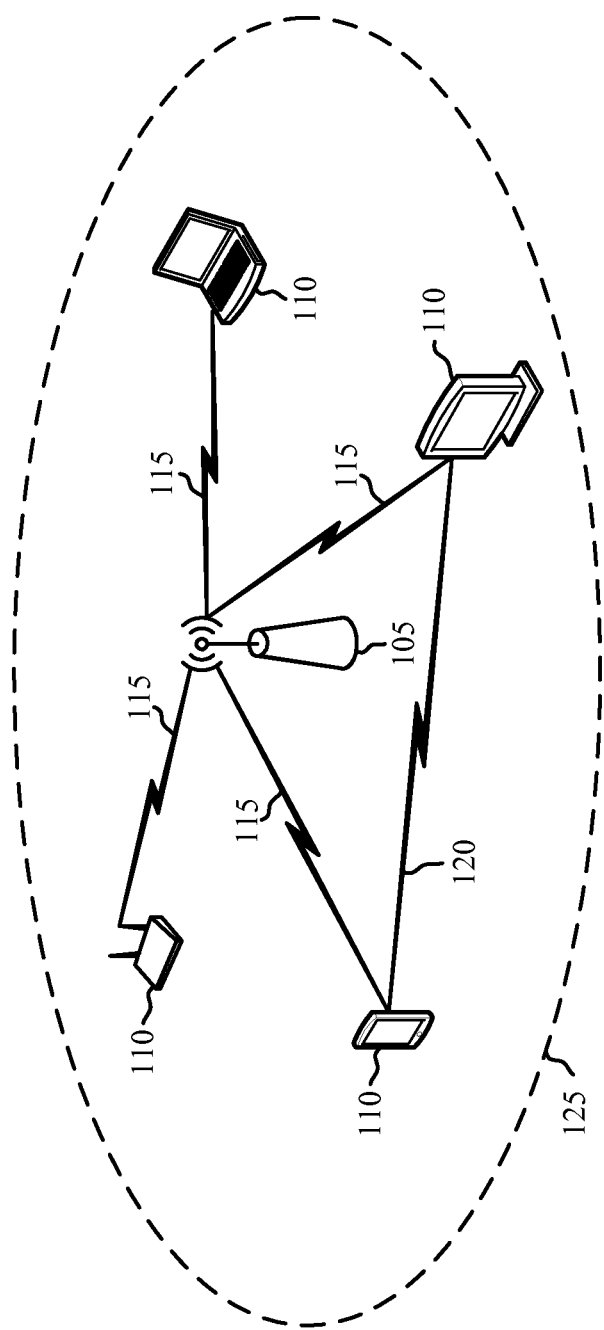
FIG. 1 shows a block diagram of a wireless communications system, in accordance with various aspects of the present disclosure.

Referring first to FIG. 1, a block diagram illustrates an example of a WLAN 100 such as, e.g., a network implementing at least one of the IEEE 802.11 family of standards. The WLAN 100 may include an access point (AP) 105 and one or more wireless devices or stations (STAs) 110, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN 100 may have multiple APs 105. Each of the wireless STAs 110, which may also be referred to as mobile stations (MSs), mobile devices, access terminals (ATs), user equipments (UEs), subscriber stations (SSs), client devices, or subscriber units, may associate and communicate with an AP 105 via a communication link 115. Each AP 105 has a geographic coverage area 125 such that STAs 110 within that area can typically communicate with the AP 105. The STAs 110 may be dispersed throughout the geographic coverage area 125. Each STA 110 may be stationary or mobile.

Although not shown in FIG. 1, a STA 110 can be within range of more than one AP 105 and can therefore associate with one or more APs 105 at different times. A single AP 105 and an associated set of STAs may be referred to as a basic service set (BSS). An extended service set (ESS) is a set of connected BSSs. A distribution system (DS) (not shown) is used to connect APs 105 in an extended service set. A geographic coverage area 125 for an AP 105 may be divided into sectors making up only a portion of the coverage area (not shown). The WLAN 100 may include APs 105 of different types (e.g., metropolitan area, home network, etc.), with varying sizes of coverage areas and overlapping coverage areas for different technologies. Although not shown, other wireless devices can communicate with the AP 105.

While the STAs 110 may communicate with each other through the AP 105 using communication links 115, each STA 110 may also communicate directly with one or more other STAs 110 via a direct wireless link 120. Two or more STAs 110 may communicate via a direct wireless link 120 when both STAs 110 are in the AP geographic coverage area 125 or when one or neither STA 110 is within the AP geographic coverage area 125 (not shown). Examples of direct wireless links 120 may include Wi-Fi Direct connections, connections established by using a Wi-Fi Tunneled Direct Link Setup (TDLS) link, and other peer-to-peer (P2P) group connections. For example, a first STA 110 may act as a group owner (GO) to provide service to a second STA 110 via direct wireless link 120. In this scenario, the first STA 110 may function similarly an AP 105 to the second STA 110. The STAs 110 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within WLAN 100.

In some cases, after a STA 110 establishes a communication link 115 or connection with an AP 105, the AP 105 and/or the STA 110 may not have any data to communicate with the other device for varying periods of time. In these scenarios, the STA 110 may enter into an idle mode or sleep state where various aspects of the STA 110 are powered down temporarily, for example one or more receivers of STA 110. The AP 105 may periodically (e.g., every 100 ms) transmit a beacon, which may indicate whether the AP 105 has any data to transmit to the STA 110. Upon establishing the communication link 115 with the STA 110, the AP 105 may communicate beacon information including the beacon interval, the length of the each beacon, etc., to the STA 110. The beacon information may then enable the STA 110 to wake up a WLAN receiver to receive beacons from the AP 105 at the designated times/intervals.

The process for waking up a WLAN receiver of the STA 110 for each beacon from the AP may consume power, may occupy communication resources, and/or may cause interference with other communications of the STA 110 (e.g., implementing Bluetooth, LTE, etc.). This may be especially the case when the AP 105 does not have data to transmit to the STA 110 for extended periods of time, thus requiring the STA 110 to wake up every beacon interval without any data pending at the AP 105.

In order to address one or more of the above mentioned issues, and others, the AP 105 and STA 110 may utilize low energy (LE) signaling, sent immediately prior to the WLAN beacon, to indicate whether the subsequent beacon will indicate that the AP 105 has data to transmit to the STA 110. The LE signaling may include Bluetooth LE (BLE) signaling communicated via a BLE transceiver or radio of the STA 110 and AP 105. In some aspects, the LE signaling may be implemented via other LE/unlicensed spectrum communication technologies. In this way, the STA 110 may wake up an LE radio for a LE wakeup time period, which may be shorter than and require significantly less power than, the WLAN radio, prior to the WLAN beacon interval to determine if the STA 110 should wake up its WLAN radio to receive data pending from the AP 105.

Figure 2:
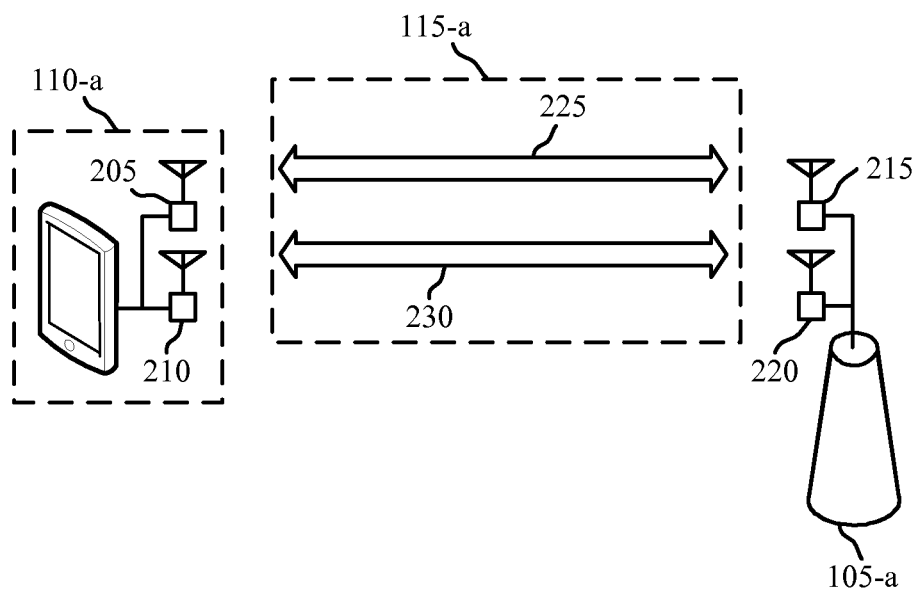
FIG. 2 shows a block diagram of a wireless communications system that includes a wireless station and an access point, in accordance with various aspects of the present disclosure.

Referring next to FIG. 2, a block diagram illustrates an example of a WLAN 200 including an AP 105-a and an STA 110-a. WLAN 200 may be an example of WLAN 100 described in reference to FIG. 1. Additionally, AP 105-a and STA 110-a may be an example of one or more aspects of AP 105 and/or STA 110 also described in reference to FIG. 1. In some cases, AP 105-a may be a soft AP or a P2P GO. The AP 105-a may include two or more radios, for example a WLAN (e.g., Wi-Fi) radio 215 and a LE radio 220. Similarly, the STA 110-a may include two or more radios, such as a WLAN radio 205 and a LE radio 210. In some implementations, LE radio 220 and/or LE radio 210 may each support Bluetooth LE (BLE) communication protocols.

In some aspects, STA 110-a may establish a WLAN communication link 225 with the AP 105-a. WLAN communication link 225 may be part of or all of communication link 115-a. The WLAN communication link 225 may be between WLAN radio 205 of STA 110-a and WLAN radio 215 of AP 105-a. The AP 105-a may communicate data to the STA 110-a, via WLAN communication link 225 (e.g., on the downlink), and STA 110-a may similarly communicate data to the AP via WLAN communication link 225 (e.g., on the uplink). Upon establishment of WLAN communication link 225, the AP may transmit beacon information to the STA 110-a. The beacon information may include beacon interval information, beacon length information, a delay time for entering into an idle mode, etc.

In some cases, the STA 110-a may not receive any data from the AP 105-a for a certain period of time. Based on this absence of communication, the STA 110-a may infer that the AP 105-a does not have any data to transmit to the STA 110-a and may enter a sleep or idle mode, thereby turning off WLAN radio 205.

Periodically, the AP 105-a may transmit via WLAN radio 215 a beacon to the STA 110-a via WLAN communication link 225. The beacon may include an indication of whether the AP 105-a has data pending to transmit to the STA 110-a. The STA 110-a may wakeup WLAN radio 205 at the specified interval (e.g., specified by the beacon information received from the AP 105-a upon establishment of WLAN communication link 225) to receive beacons from the AP 105-a. Periodically waking up WLAN radio 205 may consume large amounts of power at STA 110-a, especially when, for example, the AP 105-a does not have data to send to the STA 110-a for extended periods of time.

In some examples, the STA 110-a and/or AP 105-a may each have a LE radio 210, 220, such as a Bluetooth radio, which may support communication via BLE communication protocols, or other similar LE protocols. In this scenario, the AP 105-a and STA 110-a may establish a LE communication link 230 via LE radios 210 and 220. Once the LE communication link 230 is established, the AP 105-a may transmit an LE message including an indication of whether a TIM bit of a subsequent WLAN beacon will indicate that the AP 105-a has data to send to the STA 110-a. The AP 105-a may send the LE message prior to sending each WLAN beacon, for example at the same periodicity as the WLAN beacon.

The LE radio 210 of the STA 110-a may wakeup at time specified by the AP 105-a to receive the LE message send by the AP 105-a over LE communication link 230. If the LE message indicates that a TIM bit for the STA 110-a will be set in the subsequent WLAN beacon, or in other words that the subsequent WLAN beacon will indicate that the AP 105-a has data to transmit to the STA 110-a, the STA 110-a may wakeup or power up the WLAN radio 205 to receive the subsequent WLAN beacon. If the LE message indicates that a TIM bit for the STA 110-a will not be set in the subsequent beacon, or in other words that the subsequent beacon will not indicate that the AP 105-a has data to transmit to the STA 110-a, the STA 110-a may refrain from powering up the WLAN radio 205 for the subsequent beacon. In this way, the STA 110-a may conserve power and communication resources when the AP 105-a indicates via LE messaging that the AP 105-a does not have any pending data to send to the STA 110-a.

Figure 3A:
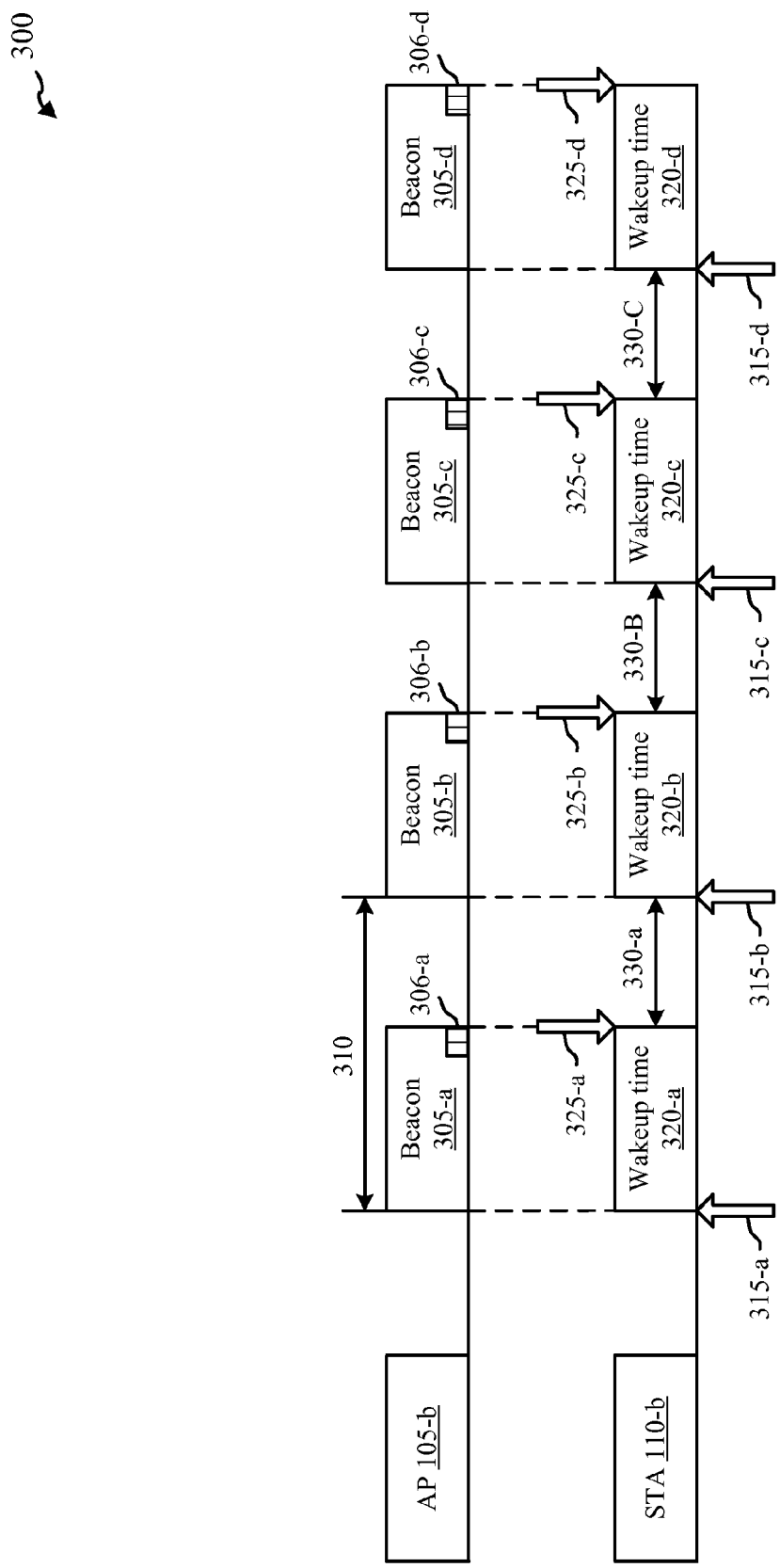
FIGS. 3A and 3B show timing block diagrams of communication of beacons from an access point to a wireless station, in accordance with various aspects of the present disclosure.

Referring to FIG. 3A, a timing block diagram 300 illustrates beacon transmissions from an AP 105-b to an STA 110-b, in accordance with various examples. AP 105-b and/or STA 110-b may be associated with WLAN 100 and/or 200 described in reference to FIGS. 1 and/or 2. AP 105-b and/or STA 110-b may implement one or more aspects of APs 105 and/or STAs 110 described in reference to FIGS. 1 and/or 2, including, for example LE (e.g., BLE) radios 220, 210 and/or WLAN radios 215, 205.

In one example, AP 105-b may transmit a first beacon 305-a and a second beacon 305-b a time interval or beacon interval 310 after the beginning of the transmission of the first beacon 305-a. In some cases, the beacon interval 310 may be 100 ms, or any other value configured by the AP 105-b. Each beacon 305 may range, for example, from approximately 150 bytes in length to approximately 350 bytes. In some cases, each beacon 305 may include information related to the beacon interval 310. As shown, the AP 105-b may transmit beacons 305-c and 305-d, each separated by a beacon interval 310. However, it should be appreciated that the AP 105-b may continue to transmit beacons until the STA 110-b moves out of the geographic coverage area 125 of the AP 105-b, terminates the communication link 115 with the AP 105-b, or otherwise disassociates from the AP 105-b. In some cases, each beacon 305 may include an indication 306 (e.g., beacon 305-a including indication 306-a, beacon 305-b including indication 306-b, beacon 305-c including indication 306-c, beacon 305-d including indication 306-d) of whether the AP 105-b has data pending to transmit to the STA 110-b. The indication 306 may be a traffic indication map (TIM) bit, for example, that when set to 1 may indicate that the AP 105-b has data to transmit to the STA 110-b. When indication is set to 0, that may indicate that the AP 105-b does not have data pending to transmit to the STA 110-*b*. It should be appreciated that other indication schemes are contemplated herein.

The STA 110-*b* may power up a WLAN radio (e.g., WLAN radio 205 of FIG. 2) of the STA 110-*b* to receive the beacon 305-*a* at 315-*a*. The WLAN radio of the STA 110-*b* may be active (e.g., consuming power) during a wakeup time period 320-*a*. The wakeup time period 320-*a* may correspond to the beacon transmission time of beacon 305-*a*. At the end or approximately the end of wakeup time period 320-*a*, the STA 110-*b* may begin to power down the WLAN radio at 325-*a*. The WLAN radio of the STA 110-*b* may remain powered down or in an idle or sleep mode for a sleep time period 330-*a*, which may last until beacon 305-*b* is transmitted by the AP 105-*b* to the STA 110-*b*. Alternatively stated, wakeup time period 320-*a* combined with sleep time period 330-*a* may equal the beacon interval 310.

The STA 110-*b* may continue to power up the WLAN radio at 315-*b* immediately prior to receiving beacon 305-*b*. The STA 110-*b* may power up the WLAN radio for wakeup time period 320-*b*, and power down the WLAN radio at 325-*b* at the end of beacon 305-*b* for sleep time period 330-*b*. The STA 110-*a* may continue this process of powering up the WLAN radio 315, staying active during wakeup time period 320, and powering down the WLAN radio 325 for a sleep time period 330 (e.g., through 315-*c*, 320-*c*, 325-*c*, 330-*c* and 315-*d*, 320-*d*, 325-*d*, 330-*d*, and so on) until the indication 306 of a beacon 305 signals that the AP 105-*b* has data pending to transmit to the STA 110-*a*. When the indication 306 indicates that the AP 105-*b* has data pending to transmit to the STA 110-*b*, the STA 110-*b* may power up the WLAN radio at 315 and maintain the WLAN radio in an active state beyond the wakeup time period 320 to receive data from the AP 105-*b* (not shown). Once the AP 105-*b* is finished transmitting data to the STA 110-*a*, the STA 110-*b* may power down the WLAN radio and resume the wakeup cycle, as described above.

As illustrated by timing block diagram 300, the STA 110-*b* may expend unnecessary power by activating the WLAN radio of STA 110-*b* to receive beacons 305 from AP 105-*b*, especially when the AP 105-*b* may not transmit data to the STA 110-*b* for extended periods of time. Waking up the WLAN radio for each wakeup time period 320 may also occupy the WLAN radio such that STA 110-*b* may be limited or not able to communicate with other APs 105 or STAs 110 during each wakeup time period 320. Additionally or alternatively, maintaining the WLAN radio in an activate state for wakeup time period 320 may also affect communication performance of other radios implemented on the STA 110-*b* and/or other communication technologies supported by STA 110-*b* (e.g., LTE, Bluetooth, etc.).

Figure 3B:
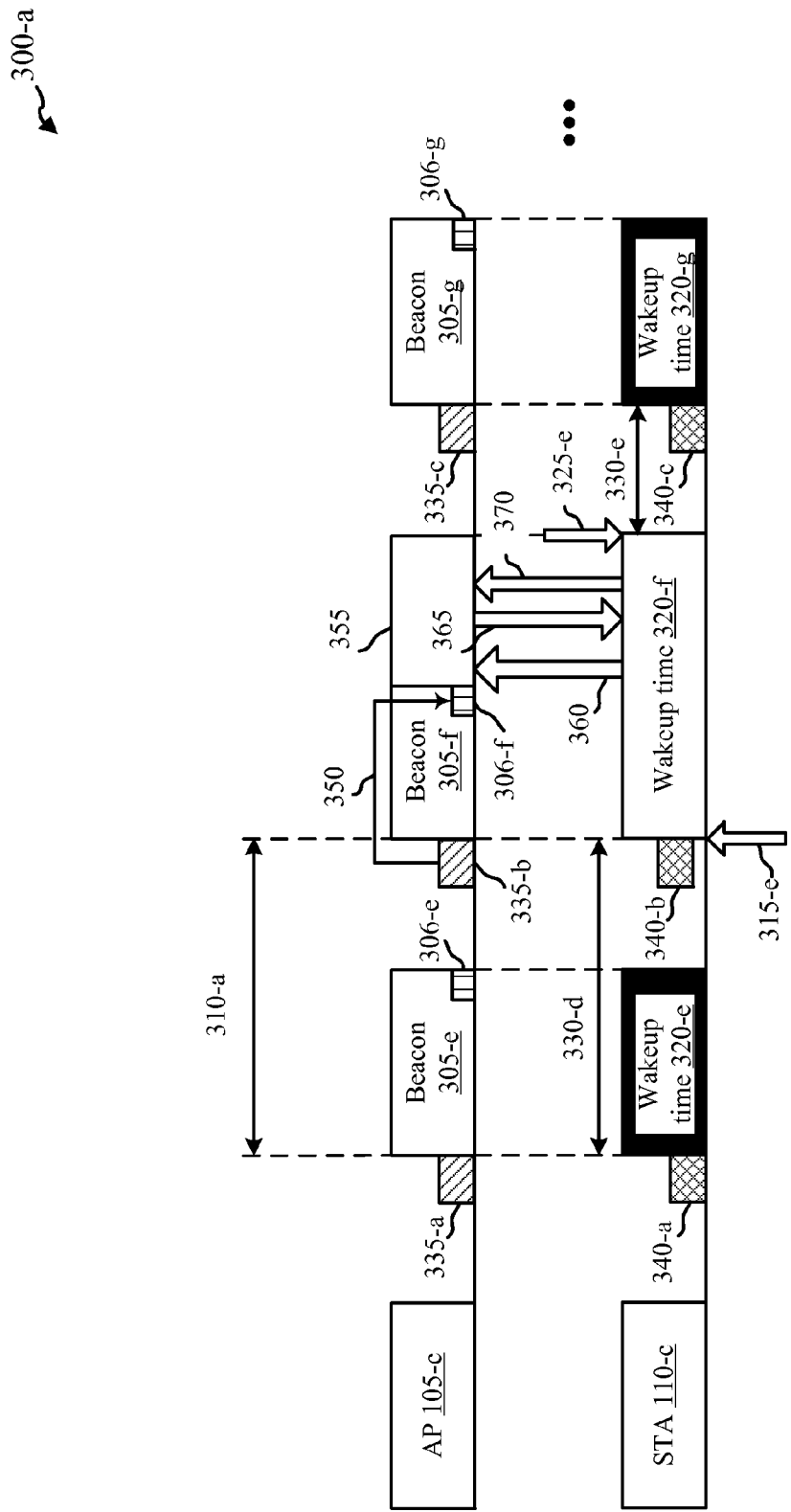

Referring to FIG. 3B, a timing block diagram 300-*a* illustrates beacon transmissions and LE transmissions from an AP 105-*c* to an STA 110-*c*, in accordance with various examples. AP 105-*c* and/or STA 110-*c* may be associated with WLAN 100 and/or 200 described in reference to FIGS. 1 and/or 2. AP 105-*c* and/or STA 110-*c* may implement one or more aspects of APs 105 and/or STAs 110 described in reference to FIGS. 1, 2, and/or 3A, including, for example LE (e.g., BLE) radios 220, 210 and/or WLAN radios 215, 205.

In one example, AP 105-*c* and STA 110-*c* may establish a WLAN communication link, such as WLAN communication link 225 of FIG. 2, and an LE communication link, such as LE communication link 230 of FIG. 2. Prior to transmitting a beacon 305, the AP may transmit an LE message 335 to the STA 110-*c* that indicates whether the subsequent beacon 305 will include an indication 306 of whether the AP 105-*c* has data pending to transmit to the STA 110-*c*. In this way, the STA 110-*c* may only wake up an LE radio (e.g., LE radio 210 of FIG. 2) for an LE wakeup time period 340 to determine if the STA 110-*c* needs to wake up a WLAN radio (e.g., WLAN radio 205 of FIG. 2) to receive data from the AP 105-*c*. Waking up the LE radio for LE wakeup time period 340 may require less power and be for substantially less time than a (beacon) wakeup time period 320.

As illustrated, the AP 105-*a* may first transmit an LE message 335-*a* to STA 110-*c* immediately prior to transmitting a beacon 305-*e*. LE message 335-*a* may indicate that beacon 305-*e* will not indicate via indication 306-*e* that the AP 105-*c* has data pending to send to the STA 110-*c*. As described above, the indication 306-*e* may be in the form of a TIM bit set to 0. It should, however, be appreciated that other means for indicating whether the AP 105-*c* has data to send to the STA 110-*c* are contemplated herein.

The STA 110-*c* may wake up its LE radio for an LE wakeup time period 340-*a* to receive LE message 335-*a*. Because the LE message 335-*a* signals that the indication 306-*e* of beacon 305-*a* will indicate the AP 105-*c* does not have data to send to the STA 110-*c*, the STA 110-*c* may refrain from powering up its WLAN radio at 315, maintaining the radio in an active state for wakeup time period 320-*e*, and subsequently powering down the radio at 325. Instead, the STA 110-*c* may maintain its WLAN radio in a sleep state during sleep time period 330-*d* that may be equivalent to the beacon interval 310-*a*, or until the next beacon 305-*f* is sent by the AP 105-*c*.

The AP 105-*c* may then transmit a second LE message 335-*b* immediately before the end of beacon interval 310-*a*. The AP 105-*c* may have data to send to the STA 110-*c*, and may set the indication 306-*f* to reflect that (e.g., by setting a TIM bit to 1). Accordingly, the AP 105-*c* may set the LE message 335-*b* to indicate that data is pending for the STA 110-*c* at 350. In some cases, the WLAN radio of the AP 105-*c* may communicate this information to the LE radio of the AP 105-*c*, so that the LE radio may configure the LE message 335-*b*. Immediately after transmitting the LE message 335-*b*, the AP 105-*c* may transmit beacon 305-*f* to STA 110-*c* via its WLAN radio.

Upon receiving LE message 335-*b* during LE wakeup time period 340-*b*, indicating that the AP 105-*c* has data to send, i.e., that indication 306-*f* is set (e.g., TIM bit set to 1), the STA 110-*c* may wake up its WLAN radio immediately before beacon 305-*f* is transmitted by the AP 105-*c* at 315-*e*. After receiving the beacon 305-*f* including indication 306-*f*, the STA 110-*c* may transmit a PS Poll message 360 to the AP 105-*c* via its WLAN radio during an (extended) wakeup time period 320-*f*. As the AP 105-*c* has data to send to the STA 110-*c*, the AP 105-*c* may maintain its WLAN radio active for an additional time period 355 to transmit the data. Upon receiving the PS Poll message 360 from the STA 110-*c*, the AP 105-*c* may then transmit data 365 to the STA 110-*c*. Upon receiving data 365, the STA 110-*c* may send an acknowledgement (ACK) 370, and subsequently power down its WLAN radio at 325-*e* and maintain the WLAN radio in sleep or idle mode for sleep time period 330-*e* until a subsequent beacon is sent.

Immediately before a next beacon interval elapses, the AP 105-*c* may similarly send an LE message 335-*c* followed by a beacon 305-*g*. If the AP 105-*c* does not have any data to send to the STA 110-*c*, the AP 105-*c* may indicate such in the LE message 335-*c* (e.g., that indication 306-*g* signals that no data is pending transmission to the STA 110-*c*). The STA 110-*c* may power up its LE radio for LE wakeup time period 340-*c* to receive the LE message 335-*c*. As the LE message 335-*c* indicates that no data is pending transmission, the STA 110-*c* may forego waking up its WLAN radio for wakeup time period 320-*g*. The above described process may continue in like fashion until more data is received, upon which the STA 110-*c* may again wake up its WLAN radio.

The STA 110-*c* may realize significant power gains by only powering up its WLAN radio, when data is pending from a serving AP 105-*c*, to receive a beacon 305 from AP 105-*c*. The STA 110-*c* may also realize improvements in communication performance, for example via other radios/transceivers implemented on STA 110-*c*, due to less time maintaining the WLAN radio in an active state.

Figure 4A:
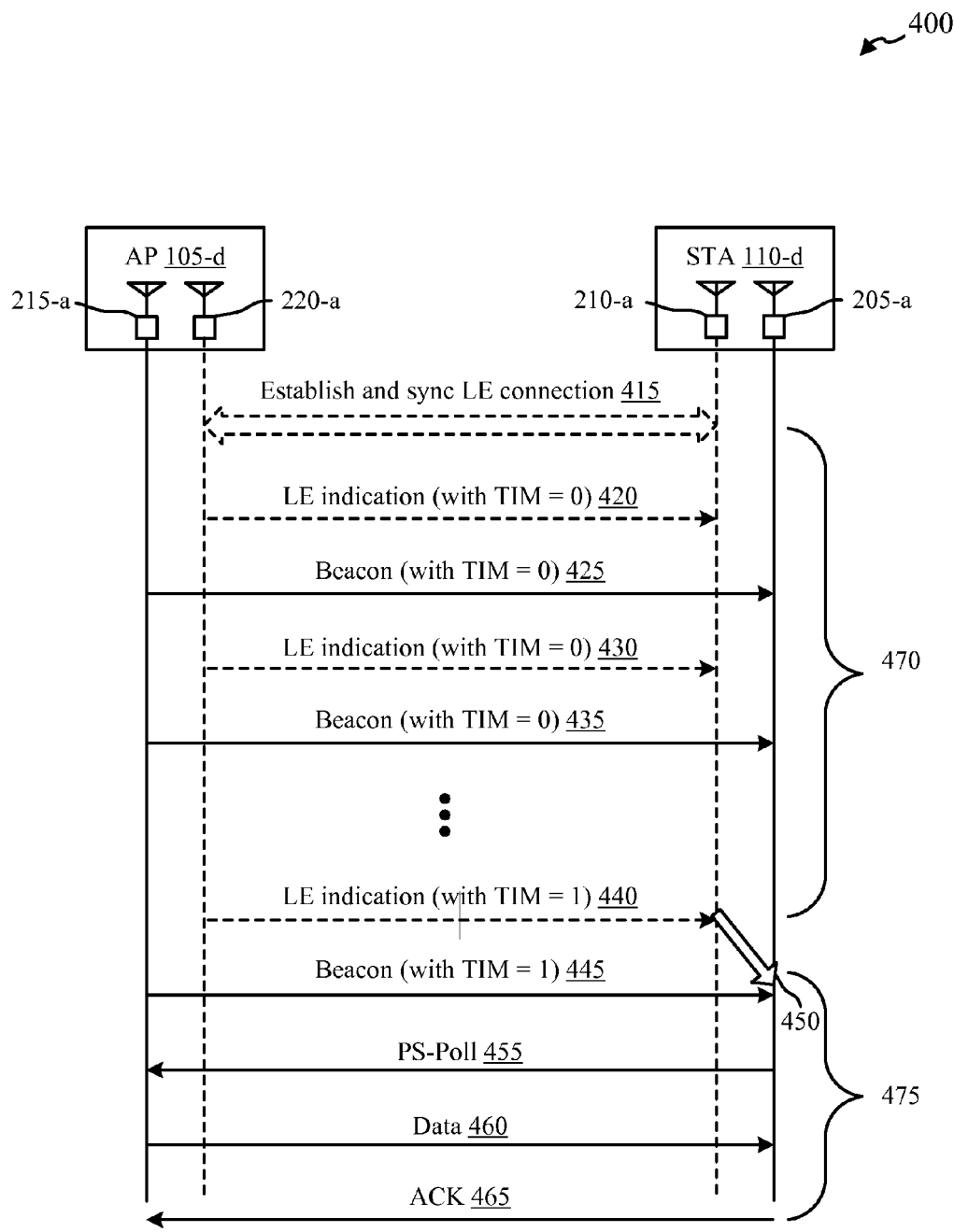
FIGS. 4A and 4B show flow block diagrams of communications between an access point and a station each utilizing two radios, in accordance with various aspects of the present disclosure.

Referring to FIG. 4A, a flow block diagram 400 illustrates communication of beacons and LE transmissions between an AP 105-*d* to an STA 110-*d*, in accordance with various examples. AP 105-*d* and/or STA 110-*d* may be associated with WLAN 100 and/or 200 described in reference to FIGS. 1 and/or 2. AP 105-*d* and/or STA 110-*d* may implement one or more aspects of APs 105 and/or STAs 110 described in reference to FIGS. 1, 2, 3A, and/or 3B. The AP 105-*d* may implement two or more radios/transceivers, including a WLAN radio 215-*a* and an LE radio (BLE radio) 220-*a*. Similarly, STA 110-*d* may implement two or more radios, including a WLAN radio 205-*a* and an LE radio (BLE radio) 210-*a*. WLAN radios 205-*a* and 215-*a* and/or LE radios 210-*a* and 220-*a* may be examples of one or more aspects of WLAN radios 205, 215 and/or LE radios 210 and 220 described in reference to FIG. 2

After STA 110-*d* and AP 105-*d* have formed a WLAN connection, the AP 105-*d* or STA 110-*d* may initiate the establishment of an LE connection (e.g., a BLE or other similar low energy/unlicensed spectrum communication technology). The AP 105-*d* and the STA 110-*d* may establish and synchronize the LE connection at 415*v* via LE radios 220-*a* and 210-*a*. The AP 105-*d* may then transmit an LE indication (e.g., LE message 335 of FIGS. 3A and 3B) indicating that the TIM of the subsequent beacon will be set to 0 at 420 via LE radio 220-*a* Immediately following the transmission of the LE indication at 420, the AP 105-*d* may transmit, via WLAN radio 215-*a*, a beacon (e.g., beacon 305 of FIGS. 3A and 3B) with TIM set to 0 at 425. The AP 105-*d* may subsequently transmit a second LE indication (TIM set to 0) via LE radio 220-*a* at 430 followed by a second beacon (TIM set to 0) at 435 via radio 215-*a*. The AP 105-*d* may transmit each beacon at a set interval (e.g., according to beacon interval 310 of FIGS. 3A and 3B, for example every 100 ms). The AP 105-*d* may continue transmitting similar LE indications and beacons (e.g., with TIMs set to 0) according to the configured beacon interval until the AP 105-*d* has data to transmit to the STA 110-*d*.

During the time period 470 when the AP 105-*d* is transmitting LE indications signaling no data is pending at the AP 105-*d* for transmission to the STA 110-*d*, the STA 110-*d* may maintain its WLAN radio 205-*a* in a sleep or idle mode. As beacons sent at 425 and 435 indicate no data is pending from transmission (e.g., TIMs set to 0), the STA 110-*d* does not need to power up WLAN radio 205-*a*. Also during time period 470, the STA 110-*d* may wake up its LE radio 210-*a* to receive LE indications transmitted at 420, 430, and so on.

When the AP 105-*d* does have data to send to STA 110-*d*, the AP 105-*d* may instruct LE radio 220-*a* to set an LE indication accordingly, and send LE indication with a TIM set to 1 at 440. Upon receiving the LE indication sent at 440, the STA 110-*d* may power up its WLAN radio 205-*a* at 450 (e.g., according to the process described above in reference to FIG. 3B). WLAN radio 205-*a* may then be powered on to receive the beacon transmitted by the AP 105-*d* at 445 (with TIM set to 1).

Upon receiving the beacon sent at 445, the STA 110-*d* may instruct WLAN radio 205-*a* to transmit a PS Poll message at 455 to the AP 105-*d*. The AP 105-*d* may then transmit data at 460 to the STA 110-*d* via WLAN radio 215-*a*. Once the STA receives all of the data sent at 460, the STA 110-*d* may respond by sending an ACK at 465, also via WLAN radio 205-*a*. The AP 105-*d* and STA 110-*d* may then revert to the LE/beacon messaging scheme as described above until the AP 105-*d* has further data to send to STA 110-*d* or the STA 110-*d* moves out of the coverage area (e.g., geographic coverage area 125 of FIG. 1) of AP 105-*d*.

As illustrated, the STA 110-*d* only powers up WLAN radio 205-*a* upon receipt of an LE message indicating that the AP 105-*d* has data to send to the STA 110-*d*, and maintains the WLAN radio 205-*a* in an active state for time period 475 (e.g., until the data communications are complete and acknowledged). In this way, the STA 110-*d* may conserve power resources (e.g., battery power), by only selectively powering up its WLAN radio 205-*a* to receive beacons transmitted by AP 105-*d*.

Each LE message is described as immediately preceding each beacon according to the same time interval, thus reducing messaging needed to configure and align the LE wake up times with LE message transmissions. However, it should be appreciated that the LE indication or message may be transmitted at any time in relation to each beacon, at any time interval.

Figure 4B:
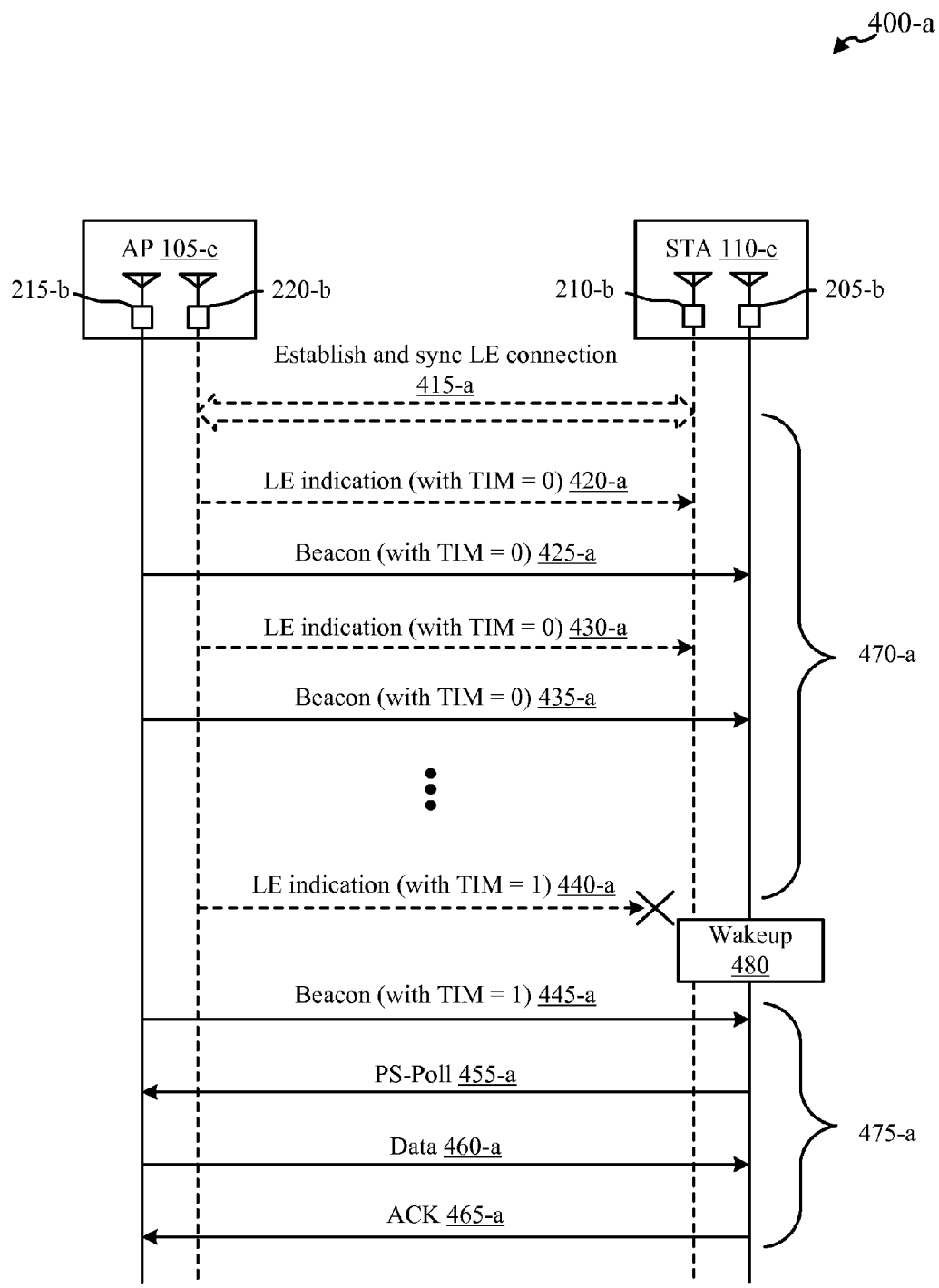

Referring to FIG. 4B, a flow block diagram 400-*a* illustrates communication of beacons and LE transmissions between an AP 105-*e* to an STA 110-*e*, in accordance with various examples. AP 105-*e* and/or STA 110-*e* may be associated with WLAN 100 and/or 200 described in reference to FIGS. 1 and/or 2. AP 105-*e* and/or STA 110-*e* may implement one or more aspects of APs 105 and/or STAs 110 described in reference to FIGS. 1, 2, 3A, and/or 3B. The AP 105-*e* may implement two or more radios/transceivers, including a WLAN radio 215-*b* and an LE radio (BLE radio) 220-*b*. Similarly, STA 110-*e* may implement two or more radios, including a WLAN radio 205-*b* and an LE radio (BLE radio) 210-*b*. WLAN radios 205-*b* and 215-*b* and/or LE radios 210-*b* and 220-*b* may be examples of one or more aspects of WLAN radios 205, 215 and/or LE radios 210 and 220 described in reference to FIGS. 2 and/or 4A.

As similarly described above in reference to FIG. 4, after STA 110-*e* and AP 105-*e* have formed a WLAN connection, the AP 105-*e* or STA 110-*e* may initiate the establishment of an LE connection (e.g., a BLE or other similar low energy/unlicensed spectrum communication technology). The AP 105-*e* and the STA 110-*e* may establish and synchronize the LE connection at 415-*a* via radios 220-*b* and 210-*b*. The AP 105-*e* may then transmit an LE indication (e.g., LE message 335 of FIGS. 3A and 3B) indicating that the TIM of the subsequent beacon will be set to 0 at 420-*a* via LE radio 220-*b*. Immediately following the transmission of the LE indication at 420-*a*, the AP 105-*e* may transmit, via WLAN radio 215-*b*, a beacon (e.g., beacon 305 of FIGS. 3A and 3B) with TIM set to 0 at 425-*a*. The AP 105-*e* may subsequently transmit a second LE indication (TIM set to 0) via LE radio 220-*b* at 430-*a* followed by a second beacon (TIM set to 0) at 435-*a* via radio 215-*b*. The AP 105-*e* may transmit each beacon at a set interval (e.g., according to beacon interval 310 of FIGS. 3A and 3B, for example every 100 ms). The AP 105-*e* may continue transmitting similar LE indications and beacons (e.g., with TIMs set to 0) according to the configured beacon interval until the AP 105-*e* has data to transmit to the STA 110-*e*.

During the time period 470-*a* when the AP 105-*e* is transmitting LE indications signaling no data is pending at the AP 105-*e* for transmission to the STA 110-*e*, the STA 110-*e* may maintain its WLAN radio 205-*b* in a sleep or idle mode. Also during time period 470-*a*, the STA 110-*e* may wake up its LE radio 210-*b* to receive LE indications transmitted at 420-*a*, 430-*a*, and so on.

When the AP 105-*e* does have data to send to STA 110-*e*, the AP 105-*e* may instruct LE radio 220-*b* to set an LE indication accordingly, and send LE indication with a TIM set to 1 at 440-*a*. Due to interference, radio malfunction, etc., the STA 110-*e* may not receive the LE indication sent at 445. Upon not receiving an LE indication at the designated time, the STA 110-*e* may automatically power up its WLAN radio 205-*b* in case the subsequent beacon indicates that the AP 105-*e* has data to send to the STA 110-*e* at 480. By automatically powering up the WLAN radio 205-*a* when an LE indication is not received at the specified time, the STA 110-*e* may minimize delay associates with receiving data pending transmission from AP 105-*e*. The WLAN radio 205-*b* may, accordingly, be powered on to receive the beacon transmitted by the AP 105-*d* at 445-*a* (with TIM set to 1).

Upon receiving the beacon sent at 445-*a*, the STA 110-*e* may instruct WLAN radio 205-*a* to transmit a PS Poll message at 455-*a* to the AP 105-*e*. The AP 105-*e* may then transmit data at 460-*a* to the STA 110-*e* via WLAN radio 215-*b*. Once the STA 110-*e* receives all of the data sent at 460-*a*, the STA 110-*e* may respond by sending an ACK at 465-*a*, to complete the data transfer process.

As illustrated, the STA 110-*e* only powers up WLAN radio 205-*b* when an LE indication is not received at the designated time, and maintains the WLAN radio 205-*a* in an active state for time period 475-*a* (e.g., until the data communications are complete and acknowledged). In this way, the STA 110-*e* may conserve power resources (e.g., battery power), by only selectively powering up its WLAN radio 205-*b* to receive beacons transmitted by AP 105-*d*.

Figure 5:
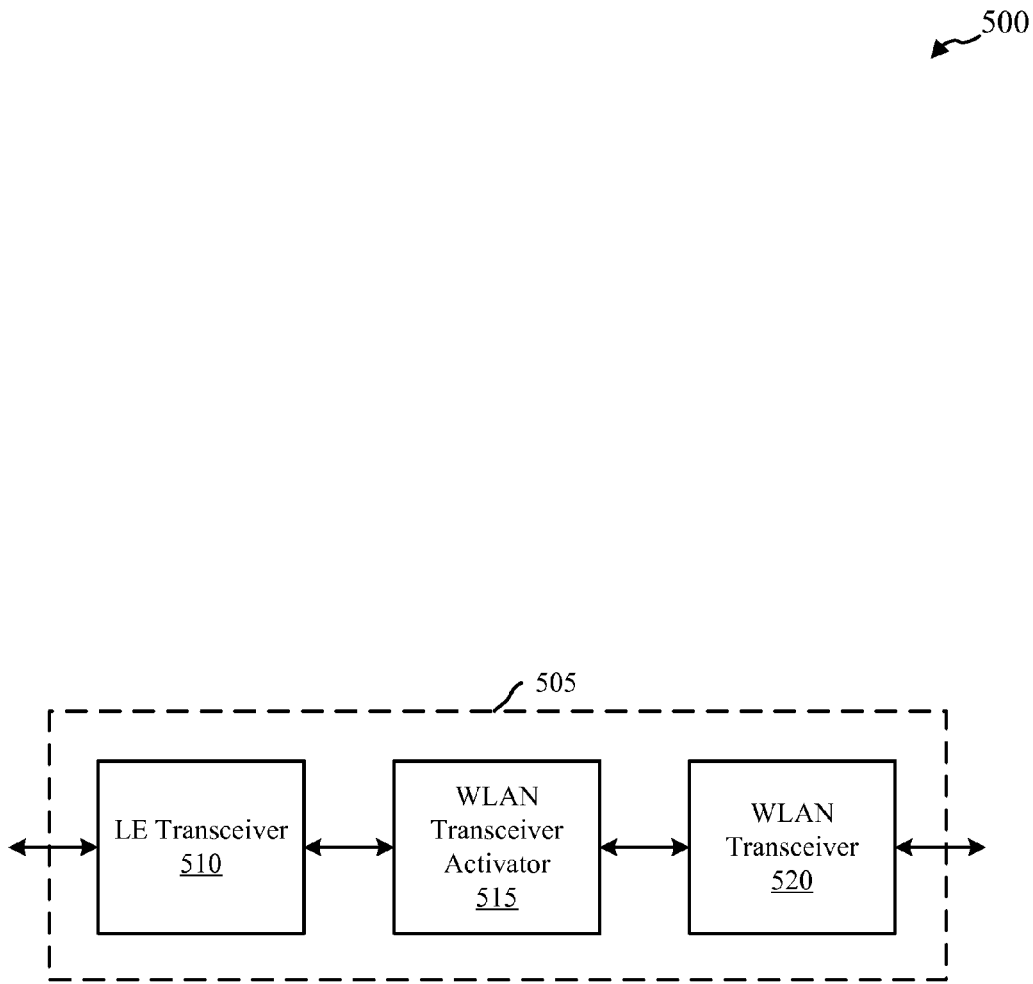
FIG. 5 shows a block diagram of a device configured for use in wireless communication, in accordance with various aspects of the present disclosure.

FIG. 5 shows a block diagram 500 of an apparatus 505 for use in a wireless STA or client device for wireless communication, in accordance with various aspects of the present disclosure. In some examples, the apparatus 505 may be an example of aspects of one or more of the wireless STAs 110 described with reference to FIGS. 1, 2, 3A, 3B, 4A, and/or 4B. The apparatus 505 may also be or include a processor (not shown). The apparatus 505 may include a low energy (LE) transceiver 510, a WLAN transceiver activator 515, and/or a WLAN transceiver 520. Each of these blocks may be in communication with each other.

The apparatus 505, through the LE transceiver 510, the WLAN transceiver activator 515, and/or the WLAN transceiver 520, may be configured to perform functions described herein. For example, the apparatus 505 may be configured to activate the WLAN transceiver 520 to receive a beacon from an AP, such as the AP 105 described above in reference to previous Figures. The activation of the WLAN transceiver 520 may occur in response to receiving an LE message via LE transceiver 510 signaling that the beacon will indicate that the AP has data pending to transmit to the apparatus 505.

The components of the apparatus 505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

The LE transceiver 510, which may be a Bluetooth transceiver, may receive and transmit messages using a LE communication protocol, such as a BLE communication protocol or other similar LE/unlicensed spectrum communication protocol. The LE transceiver 510 may receive information such as packets, user data, and/or control information associated with various information channels (e.g., control channels, data channels, etc.). The LE transceiver 510 may be configured to receive LE messages, from an AP 105 or P2P GO, that may indicate whether a subsequent beacon, transmitted using a WLAN communication protocol, will indicate that the AP 105 has data pending to transmit to the apparatus 505. In some cases, the LE message may indicate whether a TIM of the next beacon is set to a 1, indicating that the AP 105 has data to send to the apparatus 505, or a 0, indicating that the AP 105 does not have data to send to the apparatus 505. The LE transceiver 510 may communicate information relating to the LE message(s) to the WLAN transceiver activator 515.

The WLAN transceiver 520 may receive and transmit messages using a WLAN communication protocol. The WLAN transceiver 520 may receive information such as packets, user data, and/or control information associated with various information channels (e.g., control channels, data channels, etc.). The WLAN transceiver 520 may be configured to receive WLAN beacons, for example from an AP 105, that may indicate whether the AP 105 has data pending to transmit to the apparatus 505. In some cases, the WLAN beacon may include a TIM bit to indicate whether the AP 105 has data to transmit to the apparatus 505 (e.g., a 1 indicated data, and a 0 indicating no data). The WLAN transceiver 520 may further be configured to receive and transmit data to one or more APs 105 or P2P GOs.

The WLAN transceiver activator 515 may receive information concerning whether the WLAN beacon will indicate (e.g., via a TIM bit), that the AP 105 has data to transmit to the apparatus 505. The information may be based on an LE message received by the LE transceiver 510 immediately prior to the WLAN beacon. If the LE message indicates that a TIM bit of the subsequent beacon corresponding to the apparatus 505 will be set to 1, then the WLAN transceiver activator 515 may instruct the WLAN transceiver 520 to wake or power up to receive the subsequent beacon. The WLAN transceiver 520 may subsequently remain in the active state to receive the data transmitted from the AP 105. If, however, the LE message indicates that the subsequent beacon's TIM will be set to 0, then the WLAN transceiver activator 515 may refrain from instructing the WLAN transceiver to power up. In this way, if no data is pending transmission to the apparatus 505, the device may conserve power resources by not powering up the WLAN transceiver 520 (e.g., only the LE transceiver 510 is active during the beacon interval, and the WLAN transceiver 520 remains in a sleep state). The apparatus 505 may further conserve power resources and ensure that no or minimal data transmissions are delayed by periodically activating the LE transceiver 510, for example according to an LE message interval, which may be set and/or communicated to the apparatus 505 by an AP 105. In some cases, the LE message interval may correspond to the WLAN beacon interval (e.g., beacon interval 310 of FIGS. 3A and 3B).

In some cases, if the LE transceiver 510 does not receive an LE message at the designated time (e.g., which may be configured by the AP 105 based on the set or preconfigured beacon interval 310), the LE transceiver may communicate this information to the WLAN transceiver activator 515. The WLAN transceiver activator 515 may then instruct the WLAN transceiver 520 to power up to receive the next WLAN beacon. In this way, if for any reason the LE message is not received successfully by the apparatus 505, the WLAN transceiver 520 may receive the next WLAN beacon in order to ensure prompt data delivery, if any data is pending for transmission to the apparatus 505.

Figure 6:
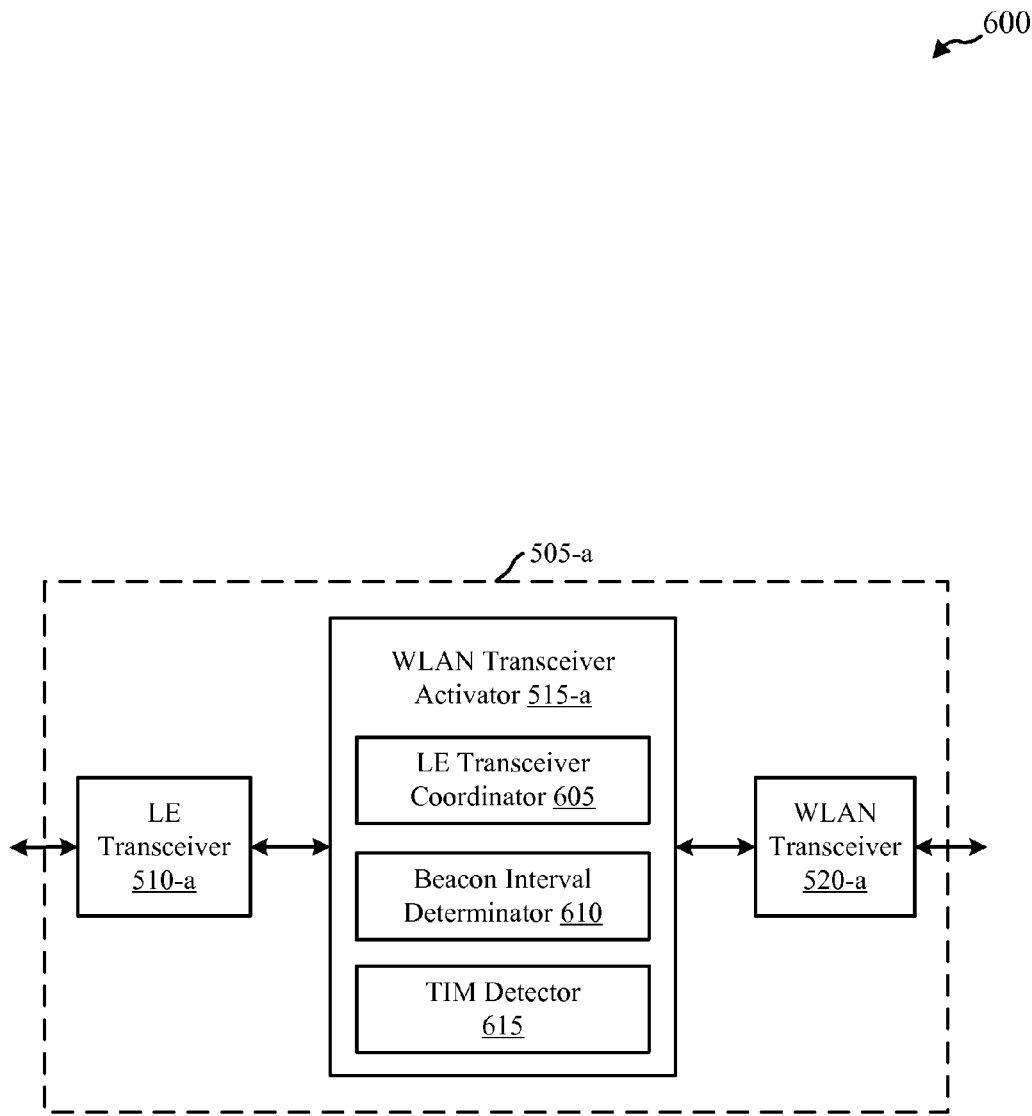
FIG. 6 shows a block diagram of another device configured for use in wireless communication, in accordance with various aspects of the present disclosure.

FIG. 6 shows a block diagram 600 of an apparatus 505-a that may be used in a wireless STA for wireless communication, in accordance with various examples. The apparatus 505-a may be an example of one or more aspects of a wireless STAs 110 described with reference to FIGS. 1, 2, 3A, 3B, 4A, and/or 4B. The apparatus 505-a may also be an example of the apparatus 505 described with reference to FIG. 5. The apparatus 505-a may also be or include a processor (not shown). The apparatus 505-a may include a low energy (LE) transceiver 510-a, a WLAN transceiver activator 515-a, and/or a WLAN transceiver 520-a. Each of these blocks may be in communication with each other. The WLAN transceiver activator 515-a may include a LE transceiver coordinator 605, a beacon interval determiner 610, and/or a TIM detector 615. The LE transceiver 510-a and the WLAN transceiver 520-a may perform the functions of the LE transceiver 510 and the WLAN transceiver 520, of FIG. 5, respectively.

The LE transceiver coordinator 605 may obtain WLAN beacon interval or timing information (e.g., beacon interval 310 of FIGS. 3A and 3B), for example from the WLAN transceiver 520-a and/or the beacon interval determiner 610. In some cases, the apparatus 505-a may configure the WLAN beacon interval itself, for example via the beacon interval determiner 610, or may receive the WLAN beacon interval from an AP 105 or P2P GO. In the event the apparatus 505-a configures the WLAN beacon interval itself, the beacon interval determiner 610 may determine a target beacon transmission time (TBTT) of the WLAN beacon. The beacon interval determiner 610 may then this information to the LE transceiver coordinator 605.

The LE transceiver coordinator 605 may then configure the LE message interval to correspond to the WLAN beacon interval, for example to immediately precede the beginning of each WLAN beacon interval. The LE transceiver coordinator 605 may then instruct the LE transceiver 510-a to wake up during each LE message interval to receive LE messages from an AP 105 or P2P GO. In other cases, the AP 105 and the apparatus 505-a may configure the LE interval and/or wakeup time period upon establish of the LE communication link (e.g., LE communication link 230 of FIG. 2). This information may then be communicated to the LE transceiver coordinator 605, which may then instruct the LE transceiver 510-a to wake up or power up at the designated times.

The TIM detector 615 of the WLAN transceiver activator 515-a may receive the LE message received by the LE transceiver 510-a, and determine whether the LE message signals that the TIM of the next beacon will be set to a 1 or 0. If the TIM detector 615 determines that the next beacon will include a TIM set to 1, the TIM detector 615 may instruct the WLAN transceiver 520-a to wake up to receive the subsequent WLAN beacon. If, however, the TIM detector 615 determines that the next beacon will include a TIM set to 0, the TIM detector 615 may instruct the WLAN transceiver 520-a to remain in sleep or idle mode during the subsequent WLAN beacon interval. In some cases, the TIM detector 615 may communicate nothing to the WLAN transceiver 520-a to indicate that the next WLAN beacon will include a TIM set to 0.

Figure 7:
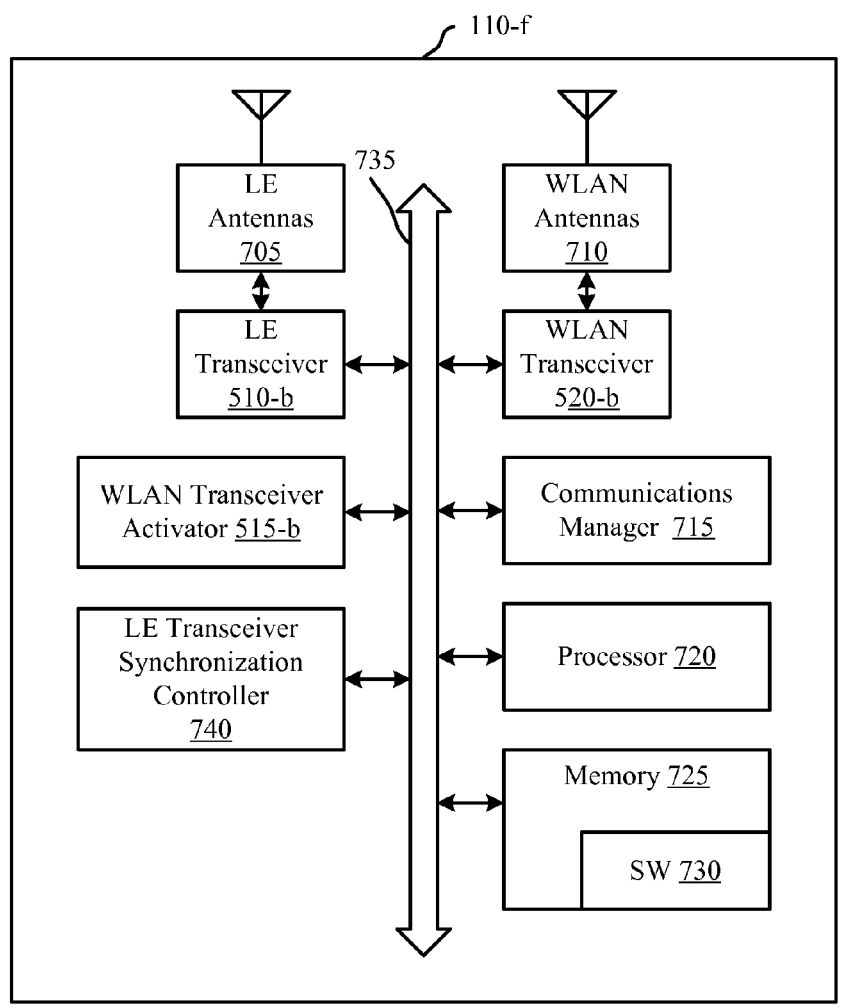
FIG. 7 shows a block diagram of a wireless station for use in wireless communication, in accordance with various aspects of the present disclosure.

Turning to FIG. 7, a block diagram 700 is shown that illustrates a wireless STA 110-f configured for activating a WLAN transceiver to receive a WLAN beacon from an AP 105, upon receiving an LE message via an LE transceiver signaling that the WLAN beacon will indicate that the AP 105 has data pending to transmit to the STA 110-f. The wireless STA 110-f may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The wireless STA 110-f may have an internal power supply (not shown), such as a small battery, to facilitate mobile operation. The wireless STA 110-f may be an example of the wireless STAs 110 of FIGS. 1, 2, 3A, 3B, 4A, and/or 4B and or may incorporate one or more aspects of apparatuses 505 and 505-a of FIGS. 5 and 6.

The STA 110-f may include a processor 720, a memory 725, a LE transceiver 510-b, LE antennas 705, a WLAN transceiver 520-b, WLAN antennas 710, a WLAN transceiver activator 515-b, and a LE transceiver synchronization controller 740. The LE transceiver 510-b may be an example of the LE radio 210 of FIGS. 2, 4A, and/or 4B and/or the LE transceiver 510 of FIGS. 5 and/or 6. The WLAN transceiver 520-b may be an example of the WLAN radio 205 of FIGS. 2, 4A, and/or 4B and/or the WLAN transceiver 520 of FIGS. 5 and/or 6. The WLAN transceiver activator 515-b may be an example of the WLAN transceiver activator 515 of FIGS. 5 and/or 6. Each of these components may be in communication with each other, directly or indirectly, over at least one bus 735.

The memory 725 may include RAM and ROM. The memory 725 may store computer-readable, computer-executable software (SW) code 730 containing instructions that are configured to, when executed, cause the processor 720 to perform various functions described herein for selectively powering up the WLAN transceiver 520-b upon receiving an indication via the LE transceiver 510-b that the subsequent WLAN beacon will indicate that an AP 105 has data to transmit to the STA 110-f. Alternatively, the software code 730 may not be directly executable by the processor 720 but may be configured to cause the computer (e.g., when compiled and executed) to perform functions described herein.

The processor 720 may include an intelligent hardware device, e.g., a CPU, a microcontroller, an ASIC, etc. The processor 720 may process information received through the LE and WLAN transceivers 510-b, 520-b and/or to be sent to the LE and WLAN transceivers 510-b, 520-b for transmission through the LE and WLAN antennas 705 and 710, respectively. The processor 720 may handle, alone or in connection with the WLAN transceiver activator 515-b, various aspects for selectively powering up the WLAN transceiver 520-b to receive a WLAN beacon indicating that an AP 105 has data to send to the STA 110-f.

The LE and/or WLAN transceivers 510-b, 520-b may each be configured to communicate bi-directionally with APs 105 described in reference to FIGS. 1, 2, 3A, 3B, 4A, and 4B. The LE and/or WLAN transceivers 510-b, 520-b may each be implemented as at least one transmitter and at least one separate receiver. The LE and/or WLAN transceivers 510-*b*, 520-*b* may each include a modem configured to modulate the packets and provide the modulated packets to the antennas 705, 710 for transmission, and to demodulate packets received from the antennas 705, 710. While the STA 110-*f* may include a single antenna (capable of both LE and WLAN communications), there may be aspects in which the STA 110-*f* may include multiple antennas 705, 710.

According to the architecture of FIG. 7, the STA 110-*f* may further include a communications manager 715. The communications manager 715 may manage communications with various APs 105 and/or P2P GOs. The communications manager 715 may be a component of the STA 110-*f* in communication with some or all of the other components of the STA 110-*f* over the at least one bus 735. Alternatively, functionality of the communications manager 715 may be implemented as a component of each of the LE and WLAN transceivers 510-*b*, 520-*b*, as a computer program product, and/or as at least one controller element of the processor 720.

The components of the STA 110-*f* may be configured to implement aspects discussed above with respect to FIGS. 3A, 3B, 4A, 4B, 5, and/or 6 and those aspects may not be repeated here for the sake of brevity. STA 110-*f* may further include a LE transceiver synchronization controller 740. The LE transceiver synchronization controller 740 may receive information from the LE transceiver 510-*b*/LE antennas 705 via bus 735 concerning timing information of LE communications with an AP 105 or P2P GO. The LE transceiver synchronization controller 740 may also receive WLAN timing information, for example from the WLAN transceiver activator 515-*b*, the WLAN transceiver 520-*b*, and/or WLAN antennas 710, for example concerning the TBTT and/or beacon interval (e.g., beacon interval 310 of FIGS. 3A and 3B). The LE transceiver synchronization controller 740 may then synchronize the LE transceiver 510-*b* with an LE transceiver of the AP 105 (e.g., LE radio 210 of FIGS. 2, 4A, and 4B) to maintain the LE connection (e.g., Bluetooth connection) and to ensure that the LE transceiver 510-*b* is waking up at the appropriate time to receive each LE message sent from the AP 105.

Figure 8:
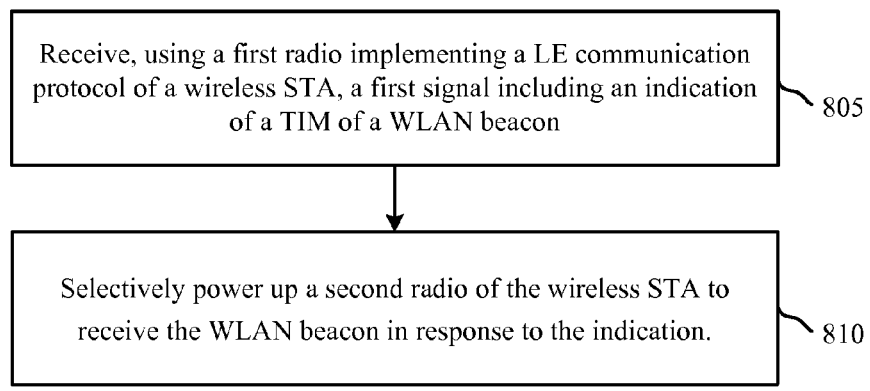
FIGS. 8-10 are flow charts illustrating examples of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of one or more of the STAs 110 described with reference to FIGS. 1, 2, 3A, 3B, 4A, 4B, and/or 7, and/or aspects of one or more of the apparatuses 505 and 505-*a* of FIGS. 5 and/or 6. In some examples, a STA 110 may execute one or more sets of codes to control the functional elements of the STA 110 to perform the functions described below. Additionally or alternatively, the STA 110 may perform one or more of the functions described below using-purpose hardware.

At block 805, the method 800 may include receiving, using a first radio implementing a LE communication protocol (e.g., BLE) of the wireless STA 110, a first signal including an indication of a TIM of a WLAN beacon. The first radio may be an example of one or more aspects of LE radio 210 of FIGS. 2, 4A, and/or 4B, and/or one or more aspects of LE transceiver 510 of FIGS. 5, 6, and/or 7. In some aspects, the first signal may be received from an AP 105 or a P2P GO. In some aspects, the second radio may be in a sleep state when the first signal is received by the first radio.

At block 810, the method 800 may include selectively powering up a second radio of the wireless STA to receive the WLAN beacon in response to the indication. The operation(s) at block 805 may be performed using the WLAN transceiver activator 515 and/or the WLAN transceiver 520 described with reference to FIGS. 5, 6, and/or 7 and/or the WLAN radio 205 described in reference to FIGS. 2, 4A, and/or 4B.

Thus, the method 800 may provide for wireless communication. It should be noted that the method 800 is just one implementation and that the operations of the method 800 may be rearranged or otherwise modified such that other implementations are possible.

Figure 9:
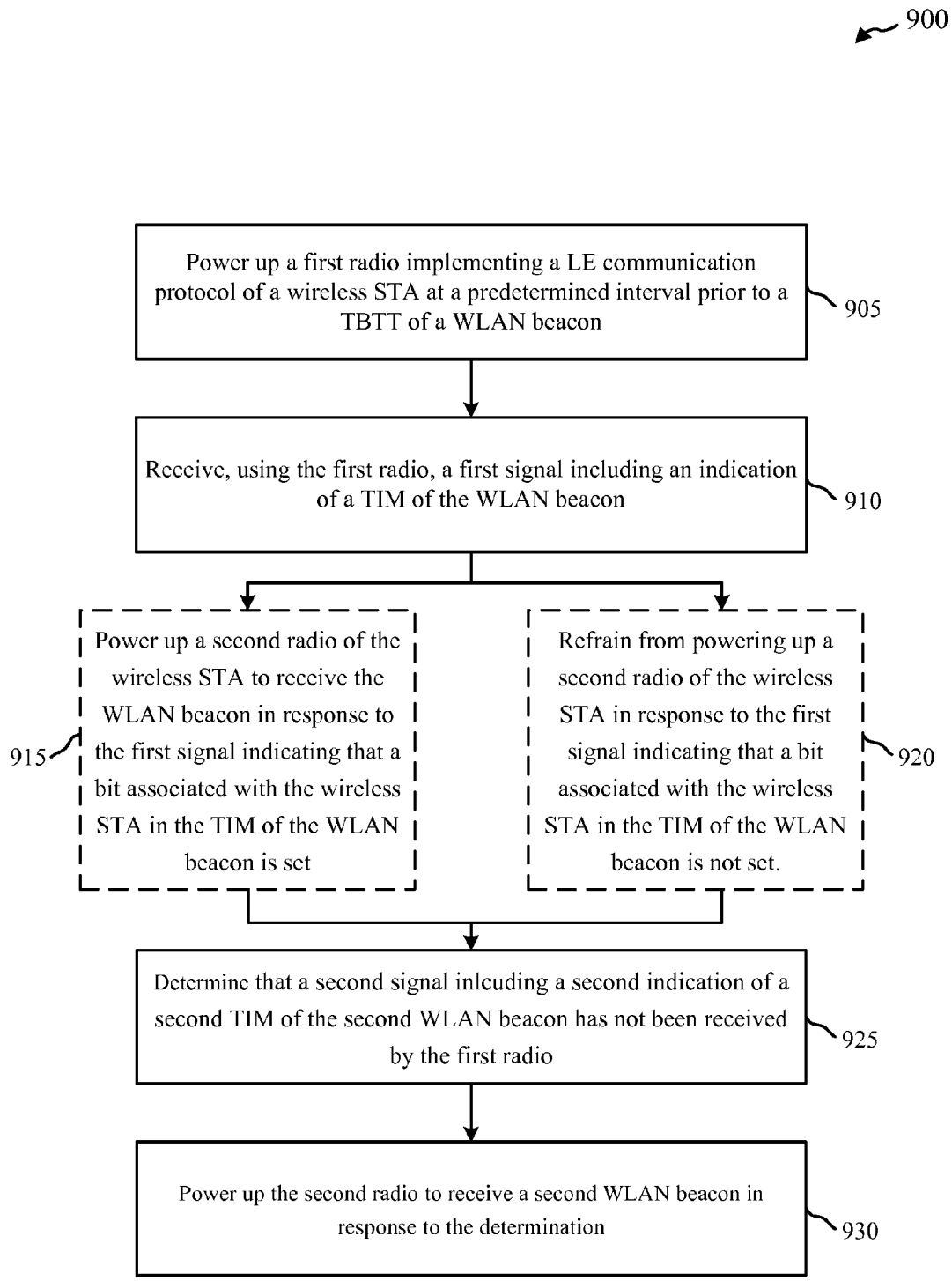

FIG. 9 is a flow chart illustrating an example of a method 900 for wireless communication, in accordance with various aspects of the present disclosure. For clarity, the method 900 is described below with reference to aspects of one or more of the STAs 110 described with reference to FIGS. 1, 2, 3A, 3B, 4A, 4B, and/or 7, and/or aspects of one or more of the apparatuses 505 and 505-*a* of FIGS. 5 and/or 6. In some examples, a STA 110 may execute one or more sets of codes to control the functional elements of the STA 110 to perform the functions described below. Additionally or alternatively, the STA 110 may perform one or more of the functions described below using-purpose hardware.

At block 905, the method 900 may include powering up a first radio implementing a LE communication protocol of a wireless STA 110 at a predetermined interval prior to a TBTT of a WLAN beacon. The operation(s) at block 905 may be performed using the LE transceiver coordinator 605, the beacon interval determiner 610, and/or the LE transceiver 510-*a* described in reference to FIG. 6.

At block 910, the method 900 may include receiving, using the first radio, a first signal including an indication of a TIM of the WLAN beacon. The operation(s) at block 910 may be performed using LE radio 210 of FIGS. 2, 4A, and/or 4B, and/or one or more aspects of LE transceiver 510 of FIGS. 5, 6, and/or 7.

At block 915, the method 900 may include powering up a second radio of the wireless STA 110 to receive the WLAN beacon in response to the first signal indicating that a bit associated with the wireless STA 110 in the TIM of the WLAN beacon is set. The operation(s) at block 915 may be performed using the TIM detector 615 and the WLAN transceiver 520 described in reference to FIG. 6, the WLAN transceiver activator 515 and/or the WLAN transceiver 520 described with reference to FIGS. 5, 6, and/or 7, and/or the WLAN radio 205 described in reference to FIGS. 2, 4A, and/or 4B.

Alternatively, at block 920, the method 900 may include refraining from powering up a second radio of the wireless STA 110 in response to the first signal indicating that a bit associated with the wireless STA 110 in the TIM of the WLAN beacon is not set. The operation(s) at block 920 may be performed using the TIM detector 615 and the WLAN transceiver 520 described in reference to FIG. 6, the WLAN transceiver activator 515 and/or the WLAN transceiver 520 described with reference to FIGS. 5, 6, and/or 7, and/or the WLAN radio 205 described in reference to FIGS. 2, 4A, and/or 4B.

At block 925, the method 900 may include determining that a second signal including a second indication of a second TIM of the second WLAN beacon has not been received by the first radio of the wireless STA 110. The operation(s) at block 925 may be performed using LE radio 210 of FIGS. 2, 4A, and/or 4B, and/or one or more aspects of LE transceiver 510 of FIGS. 5, 6, and/or 7 and/or the TIM detector 615 of FIG. 6.

At block 930, the method 900 may include powering up the second radio to receive a second WLAN beacon in response to the determination performed a block 925. The operation(s) at block 930 may be performed using the WLAN transceiver activator 515 and/or the WLAN transceiver 520 described with reference to FIGS. 5, 6, and/or 7.

Thus, the method 900 may provide for wireless communication. It should be noted that the method 900 is just one implementation and that the operations of the method 900 may be rearranged or otherwise modified such that other implementations are possible.

Figure 10:
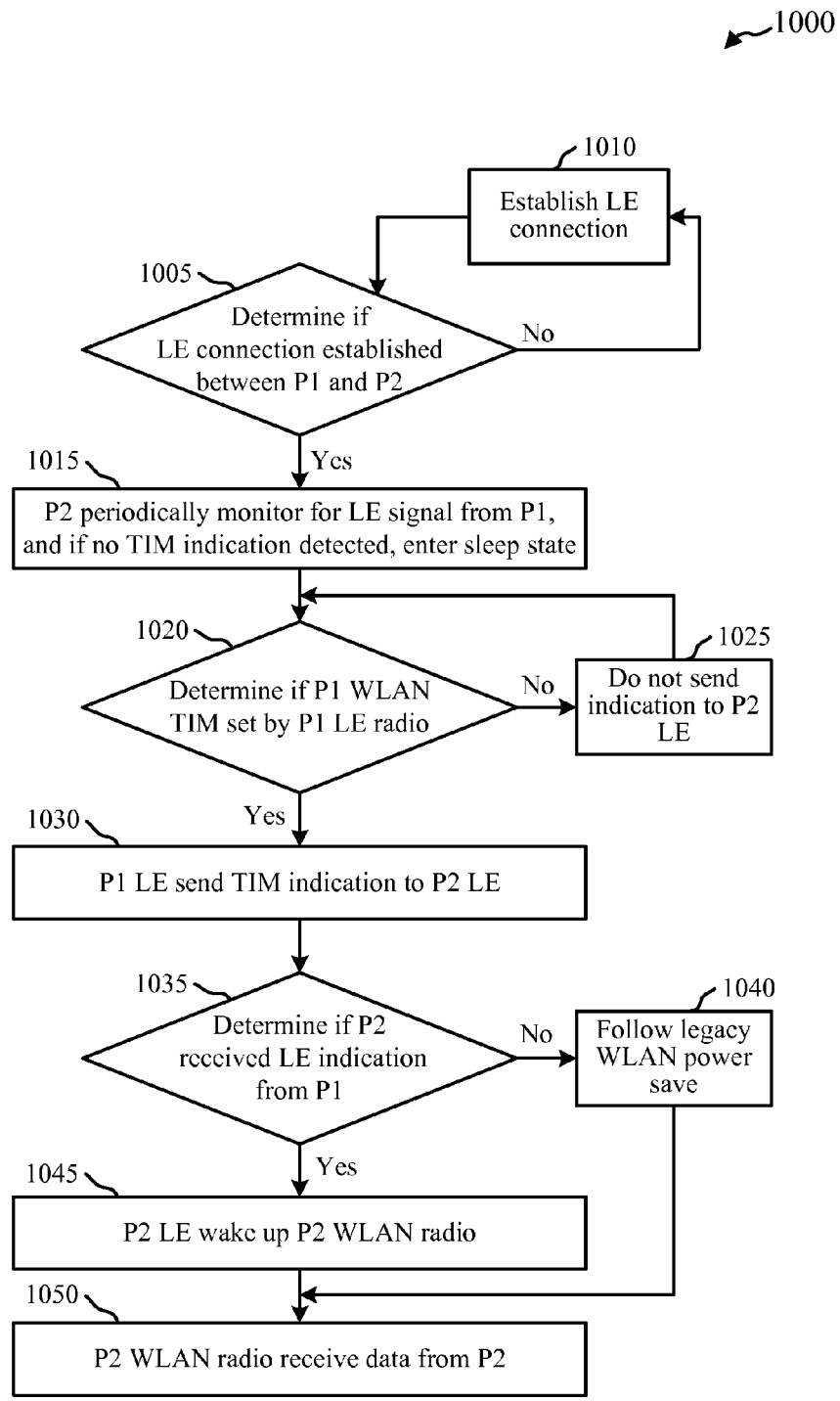

FIG. 10 is a flow chart illustrating an example of a method 1000 for wireless communication, in accordance with various aspects of the present disclosure. For clarity, the method 1000 is described below with reference to aspects of one or more of the STAs 110 and APs 105 (or P2P GOs) described with reference to FIGS. 1, 2, 3A, 3B, 4A, 4B, and/or 7 and/or aspects of one or more of the apparatuses 505 and/or 505-a of FIG. 5 and/or 6. In some examples, a STA 110 (referred to as peer 2 or P2) may execute one or more sets of codes to control the functional elements of the STA 110 to perform the functions described below. Additionally or alternatively, the STA 110 may perform one or more of the functions described below using-purpose hardware. Similarly, an AP 105 or P2P GO (referred to as peer 1 or P1) may execute one or more sets of codes to control the functional elements of the AP 105 or P2P GO to perform the functions described below. Additionally or alternatively, the AP 105 or P2P GO may perform one or more of the functions described below using-purpose hardware.

At block 1005, an AP 105 or P2P GO (P1) or an STA 110 (P2) may determine if an LE (e.g., BLE) connection has been established with the other device. If it is determined that a LE connection has not been established, P1 and P2 may establish the LE connection at 1010, for example using LE radios 210, 220 of FIGS. 2, 4A, and/or 4B, and/or LE transceiver 510 of FIGS. 5, 6, and/or 7.

Once the LE connection is established (e.g., LE communication link 230 of FIG. 2), P2 may periodically monitor for an LE signal from P1, and if no positive TIM indication is detected, may instruct a WLAN radio/transceiver of P2 (e.g., WLAN radio 205 of FIGS. 2, 4A, and/or 4B and/or WLAN transceiver 520 of FIGS. 5, 6, and/or 7) to enter/remain in a sleep state at bock 1015.

An LE radio/transceiver of P1 (e.g., LE radio 220 of FIGS. 2, 4A, and/or 4B) may continually or periodically determine if the WLAN radio/transceiver of P1 has set a TIM for a subsequent WLAN beacon at block 1020. If no TIM has been set by the WLAN radio/transceiver of P1, P1 may refrain from sending an indication to P2 via the LE communication protocol at block 1025. Alternatively, P1 may send an LE message to P2 indicating that the TIM of the subsequent WLAN beacon is set to 0. Once the LE radio/transceiver of P1 determines that the WLAN radio/transceiver of P1 has set the TIM of the next WLAN beacon to 1, the LE radio/transceiver of P1 may send an LE message indicating such to P2 at 1030.

P2 may power up its LE radio/transceiver in order to receive the LE message sent by P1, according to a designated interval communicated at the establishment of the LE connection. If P2 determines, at block 1035, that it received the LE message from P1 at the designated time, then, P2 may, in response to the LE message, wake up its WLAN radio/transceiver to receive a subsequent WLAN beacon sent by the WLAN radio/transceiver of P1 at block 1045. P2 may then receive the data sent by P1 via its WLAN radio/transceiver at block 1050.

However, if P2 does not receive the LE message from P1 at the designated time, as determined at block 1035, P2 may the follow the legacy WLAN power save procedures at block 1040. In some cases, following the legacy WLAN procedure may include waking up the WLAN radio of P2 for the next WLAN beacon, according to the configure beacon interval. In this scenario, method 1000 may continue at block 1050, where the WLAN radio of P2 may receive data sent from P2.

Thus, the method 1000 may provide for wireless communication. It should be noted that the method 1000 is just one implementation and that the operations of the method 1000 may be rearranged or otherwise modified such that other implementations are possible.

In some examples, aspects from two or more of the methods 800, 900, or 1000 may be combined. It should be noted that the methods 800, 900, and 1000 are just example implementations, and that the operations of the methods 800, 900, and 1000 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication comprising:
   powering up a first radio of a wireless station at a predetermined interval based at least in part on and prior to and in time synchronicity with a plurality of target beacon transmission times (TBTTs) of a plurality of wireless local area network (WLAN) beacons;
   receiving, using the first radio of the wireless station, a plurality of first signals, each of the first signals being received prior to a respective one of the TBTTs and comprising an indication of a traffic indication map (TIM) for a subsequent WLAN beacon of the plurality of WLAN beacons, wherein the first signals are received using a low energy (LE) communication protocol; and
   selectively powering up a second radio of the wireless station to receive selected WLAN beacons of the plurality of WLAN beacons in response to the indications.

2. The method of claim 1, wherein the first signals are received periodically at a same periodicity as the plurality of WLAN beacons.

3. The method of claim 1, wherein selectively powering up the second radio comprises:
   powering up the second radio of the wireless station to receive a first WLAN beacon of the plurality of WLAN beacons in response to a TIM for the first WLAN beacon having a bit associated with the wireless station that is set.

4. The method of claim 1, wherein selectively powering up the second radio comprises:
   refraining from powering up the second radio of the wireless station to receive a first WLAN beacon of the plurality of WLAN beacons in response to a TIM for the first WLAN beacon having a bit associated with the wireless station that is not set.

5. The method of claim 1, further comprising:
   powering up the second radio of the wireless station at a first TBTT of the plurality of TBTTs to receive a first WLAN beacon of the plurality of WLAN beacons in response to determining that a signal comprising an indication of a TIM for the first WLAN beacon has not been received prior to the first TBTT using the LE communication protocol.

6. The method of claim 1, wherein each of the first signals is received from one of the group consisting of: an access point and a peer-to-peer group owner.

7. The method of claim 6, further comprising periodically synchronizing the first radio with the access point or the peer-to-peer group owner.

8. The method of claim 1, wherein the second radio is in a sleep state when each of the first signals is received.

9. The method of claim 1, wherein the LE communication protocol comprises Bluetooth Low Energy (BLE).

10. A wireless station, comprising:
    means for powering up a first radio of the wireless station at a predetermined interval based at least in part on and prior and in time synchronicity with a plurality of target beacon transmission times (TBTTs) of a plurality of wireless local area network (WLAN) beacons;
    means for receiving, using the first radio of the wireless station, a plurality of first signals, each of the first signals being received prior to a respective one of the TBTTs and comprising an indication of a traffic indication map (TIM) for a subsequent WLAN beacon of the plurality of WLAN beacons, wherein the first signals are received using a low energy (LE) communication protocol; and
    means for selectively powering up a second radio of the apparatus to receive selected WLAN beacons of the plurality of WLAN beacons in response to the indications.

11. The wireless station of claim 10, wherein the first signals are received periodically at a same periodicity as the plurality of WLAN beacons.

12. The wireless station of claim 10, wherein the means for selectively powering up the second radio comprises:
    means for powering up the second radio to receive a first WLAN beacon of the plurality of WLAN beacons in response to a TIM for the first WLAN beacon having a bit associated with the apparatus that is set.

13. The wireless station of claim 10, wherein the means for selectively powering up the second radio comprises:
means for refraining from powering up the second radio to receive a first WLAN beacon of the plurality of WLAN beacons in response to a TIM for the first WLAN beacon having a bit associated with the apparatus that is not set.

14. The wireless station of claim 10, further comprising:
means for powering up the second radio at a first TBTT of the plurality of TBTTs to receive a first WLAN beacon of the plurality of WLAN beacons in response to determining that a signal comprising an indication of a TIM for the first WLAN beacon has not been received prior to the first TBTT using the LE communication protocol.

15. The wireless station of claim 10, wherein each of the first signals is received from one of the group consisting of: an access point and a peer-to-peer group owner.

16. The wireless station of claim 10, wherein the second radio is in a sleep state when each of the first signals is received.

17. A wireless station, comprising:
a low energy (LE) transceiver coordinator to power up a LE transceiver at a predetermined interval based at least in part on and prior to and in time synchronicity with a plurality of target beacon transmission times (TBTTs) of a plurality of WLAN beacons, wherein the LE transceiver is to receive a plurality of first signals, each of the first signals being received prior to a respective one of the TBTTs and comprising an indication of a traffic indication map (TIM) for a subsequent WLAN beacon of the plurality of WLAN beacons, wherein the first signals are received using a LE communication protocol; and
a WLAN transceiver activator to selectively power up a WLAN transceiver to receive selected WLAN beacons of the plurality of WLAN beacons in response to the indications.

18. The wireless station of claim 17, wherein the LE transceiver receives the first signals periodically at a same periodicity as the plurality of WLAN beacons.

19. The wireless station of claim 17, the WLAN transceiver activator to:
power up the WLAN transceiver to receive a first WLAN beacon of the plurality of WLAN beacons in response to a TIM for the first WLAN beacon having a bit associated with the apparatus that is set.

20. The wireless station of claim 17, the WLAN transceiver activator to:
refrain from powering up the WLAN transceiver to receive a first WLAN beacon of the plurality of WLAN beacons in response to a TIM for the first WLAN beacon having a bit associated with the apparatus that is not set.

21. The wireless station of claim 17, the WLAN transceiver activator to:
at a first TBTT of the plurality of TBTTs to receive a first WLAN beacon of the plurality of WLAN beacons in response to determining that a signal comprising an indication of a TIM for the first WLAN beacon has not been received by the LE transceiver prior to the first TBTT using the LE communication protocol.

22. The wireless station of claim 17, wherein each of the first signals is received from one of the group consisting of: an access point and a peer-to-peer group owner.

23. The wireless station of claim 17, wherein the WLAN transceiver is in a sleep state when each of the first signals is received.

24. A non-transitory computer-readable medium storing computer-executable code for wireless communication, the code executable by a processor to cause a wireless station to:
power up a first radio of the wireless station at a predetermined interval based at least in part on and prior to and in time synchronicity with target beacon transmission times (TBTTs) of a plurality of wireless local area network (WLAN) beacons;
receive, using the first radio of the wireless station, a plurality of first signals, each of the first signals being received prior to a respective one of the TBTTs and comprising an indication of a traffic indication map (TIM) for a subsequent WLAN beacon of the plurality of WLAN beacons, wherein the first signals are received using a low energy (LE) communication protocol; and
selectively power up a second radio of the wireless station to receive selected WLAN beacons of the plurality of WLAN beacons in response to the indications.

25. The non-transitory computer-readable medium of claim 24, wherein the code is further executable by the processor to cause the wireless station to:
power up the second radio of the wireless station to receive a first WLAN beacon of the plurality of WLAN beacons in response a TIM for the first WLAN beacon having a bit associated with the wireless station that is set.

26. The non-transitory computer-readable medium of claim 24, wherein the code is further executable by the processor to cause the wireless station to:
refrain from powering up the second radio of the wireless station to receive a first WLAN beacon of the plurality of WLAN beacons in response to a TIM for the first WLAN beacon having a bit associated with the wireless station that is not set.

* * * * *